Patented Mar. 19, 1935

1,995,281

UNITED STATES PATENT OFFICE 1,995,281

PROCESS FOR DISPERSING HYDROPHYLLIC MATERIAL AND PRODUCT

Albert Kuba Epstein, Chicago, Ill.

No Drawing. Application May 4, 1929,
Serial No. 360,598

14 Claims. (Cl. 99—11)

My invention relates to improved methods for "dissolving" water imbibing materials, that is, hydrophyllic materials of the character hereinafter referred to. In general, these materials do not "dissolve" in the ordinary sense of the word. They rather become colloidally dispersed or peptized, the distinction being that whereas when a substance ordinarily dissolves, it becomes molecularly dispersed, these other substances to which my processes apply become dispersed in aggregates larger than molecular. This type of dispersion is generally referred to as colloidal dispersion in counter-distinction to the ordinary kind of solution.

In general, such hydrophyllic material may be brought in contact with water, either in the form of flakes or granules or else in the form of a more or less finely comminuted powder. In either case, unsatisfactory results are generally obtained.

In the case of the flakes or granules, the exterior portions of the granules or flakes imbibe water and greatly retard the imbibition of water by the inner portions. Long standing and agitation are required and even after a long period of time, undispersed chunks or lumps are detectable.

On the other hand, if the hydrophyllic material is used in a more or less finely divided form, when the powder contacts with water or some other aqueous medium, there is a tendency for the powder to lump and due to more or less the same conditions as above indicated, homogeneous colloidal dispersion is not at all produceable or is produceable only with great difficulty.

My improved method consists in using the hydrophyllic material preferably in a more or less finely comminuted form and mixing with it a substantially non-aqueous liquid prior to introducing it to the aqueous medium. The object of this step is to wet, so far as possible each particle of the hydrophyllic material with the non-aqueous liquid so that one particle is separated from another when introduced into an aqueous medium.

Products of the nature claimed herein are usable for various purposes such as for treating egg material as referred to and claimed in my co-pending application Serial No. 312,395 filed October 13, 1928, Patent No. 1,737,365.

The non-aqueous liquid above referred to may preferably be of two types. One type is a liquid which is miscible with water and the other type is a liquid which is immiscible with water. But it is to be understood that I am not limiting my invention to these two types.

If a non-aqueous, water miscible liquid is used to wet the colloid, then this condition operates beneficially in two ways. A conglomeration of partially hydrated particles is prevented by the intervening film of non-aqueous water soluble liquid, and on the other hand, the aqueous medium is enabled to enter between the hydrophyllic particles by diffusing into the water-miscible liquid, which separates them. The result is that the objectionable lumping as above described is avoided and a rapid, homogeneous dispersion of the hydrophyllic material is effected.

If a water immiscible liquid is used, a conglomeration of partially hydrated particles is prevented by the intervening film of the non-aqueous water immiscible liquid and each individual hydrophyllic colloid particle, when in contact with the water, becomes hydrated. The result is that the tendency to lump is reduced and a homogeneous dispersion of hydrophyllic colloid is effected.

Some examples of comminuted hydrophyllic materials which may be treated by my method are as follows: gum acacia, gelatine, animal glue, gum tragacanth, pectin, casein, dextrin, lecithin and others.

Some examples of water-miscible liquids which I have used are as follows: glycerine, ethylene glycol, monoacetine, ethylene glycol monoacetate, ethylene glycol ethyl ether, diethylene glycol, ethyl alcohol, acetone, glacial acetic acid, glacial phosphoric acid, ethyl methyl ketone, sulphonated oil, isopropyl alcohol, methyl alcohol, etc.

Some examples of non-aqueous water immiscible liquids which I use are as follows: liquid mineral oils, such as "Nujol," edible glycerides such as cotton seed oil, sesame oil, sunflower oil, peanut oil and their equivalents.

In dispersing the hydrophyllic colloid in water by means of a water-immiscible liquid, I prefer to use an amount of a water-immiscible substance such as cotton seed oil in a proportion substantially much less than the water in which the colloid is dispersed.

An object of using this water immiscible substance is to lubricate the particles of the colloid and prevent their lumping when introduced in a proportionately larger amount of water, as for example: 1 lb. of powdered gum tragacanth is mixed with 6 lbs. of cotton seed oil and this is introduced into 60 pounds of water and mixed by agitation. A uniformly dispersed colloid will be obtained which may eventually be thinned out with water if desired.

I do not limit my invention to any exact amount of water but generally speaking, I desire to add an amount of water sufficient to hydrate the colloids and in some cases, in excess and this amount of water should be greater than the amount of the edible glycerides.

The types of materials which I use, some of which I have listed above, are not necessarily combinable in all permutations. There are considerations of compatibility, which, to a person skilled in the art, will be self-evident or will become evident on making a simple trial.

Monoacetin, for example, if used to wet any of the hydrophyllic materials mentioned when introduced into a sodium hydroxide solution will become hydrolyzed in a comparatively short time to sodium acetate and glycerine. This change will be undesirable if it is intended to retain monoacetin in its original form.

On the other hand, some combinations which at first sight may appear incompatible are operable when used in the proper proportions.

Alcohol is known to be capable of precipitating gum tragacanth; still, it might be used in my process for dispersing gum tragacanth in water when used in certain proportions for the reason that the ultimate dilution of the ethyl-alcohol originally used to wet the particles of gum tragacanth will be such that it will be insufficient to precipitate the gum from its ultimate dispersion in water.

For example, 1 lb. of powdered gum tragacanth may be suspended in 3 pints of alcohol and this mixture then added with agitation to 12 gallons of water. A homogeneous dispersion of tragacanth in water is thus produced.

Another example of my process is as follows: 1 lb. of powdered pectin is mixed with 5 lbs. of glycerine and this mixture is then added to 50 pounds of water, with agitation.

Another example of my invention consists in mixing together powdered pectin and glycerine as in the immediately preceding example, and then adding the resulting mixture to fruit juice in amounts required to effect a desirable result, for instance, jellying of the fruit juice. In this use the proportion may be modified greatly, depending on conditions encountered and the results required. In carrying out the process according to any embodiment of the invention, warming or heating the substances can be resorted to to promote dispersion. Agitation or mixing is, of course, used wherever necessary to facilitate dispersion.

The resultant products may be used for various purposes. Therefore I do not desire to be limited to the particular process or products mentioned, or any particular use, but aim to cover that which comes within the spirit and scope of the appended claims.

What I claim is:

1. A method of substantially homogeneously colloidally dispersing dry comminuted hydrophyllic material in an aqueous medium consisting of admixing with said material a relatively small amount of a substantially non-aqueous liquid to produce a substantially dry product and then introducing this product into a substantially larger amount of the aqueous medium whereby lumping of the hydrophyllic material is prevented.

2. A method of substantially homogeneously colloidally dispersing dry comminuted hydrophyllic material in an aqueous mediuc consisting of admixing with said material a relatively small amount of a substantially non-aqueous water-miscible liquid to produce a substantially dry product and then introducing this product into a substantially larger amount of the aqueous medium by agitation whereby lumping of the hydrophyllic material is prevented.

3. A method of substantially homogeneously colloidally dispersing dry comminuted hydrophyllic material in an aqueous medium consisting of admixing with said material a relatively small amount of a substantially non-aqueous water-immiscible liquid to produce a substantially dry product, and then introducing this product into a substantially larger amount of the aqueous medium by agitation whereby lumping of the hydrophyllic material is prevented.

4. A method of substantially homogeneously colloidally dispersing dry comminuted hydrophyllic material in an aqueous medium consisting of admixing with said material a relatively small amount of a substantially non-aqueous liquid to produce a substantially dry product and then introducing this product into a substantially larger amount of the aqueous medium by agitation and heating whereby lumping of the hydrophyllic material is prevented.

5. A method of homogeneously colloidally dispersing dry comminuted pectin in fruit juice consisting in admixing therewith a relatively small amount of glycerine and then introducing this mixture into the fruit juice by agitation and warming.

6. A substantially dry product comprising dry finely comminuted colloid material uniformly dispersed in a relatively small amount of a substantially non-aqueous liquid, the amount of non-aqueous liquid used being sufficient to enhance the dispersion of the colloid when the composition is added to an aqueous liquid.

7. A substantially dry product comprising a dry hydrophyllic colloid dispersed uniformly in a relatively small amount of a non-aqueous water miscible liquid, the amount of non-aqueous liquid used being sufficient to enhance the dispersion of the colloid when the composition is added to an aqueous liquid.

8. A substantially dry product comprising a dry hydrophyllic colloid dispersed uniformly in a relatively small amount of a non-aqueous water immiscible liquid, the amount of non-aqueous liquid used being sufficient to enhance the dispersion of the colloid when the composition is added to an aqueous liquid.

9. A new composition of matter including dry comminuted pectin dispersed in a relatively larger proportion of glycerine, the amount of glycerin used being sufficient to enhance the dispersion of the pectin when the composition is added to an aqueous liquid.

10. A substantially dry finely divided pectin product comprising, a finely divided pectin containing an appreciable amount of oil adapted to cause dispersion and complete solution of the pectin in water.

11. A finely divided pectin product comprising, finely divided purified pectin bearing a highly purified non-drying neutral mineral oil in quantity sufficient to increase the rate of solubility of said pectin in an aqueous liquid.

12. A substantially dry product comprising hydrophyllic material in finely divided form, containing an appreciable amount of oil adapted to cause complete dispersion of the hydrophyllic material in water.

13. A finely divided hydrophyllic product comprising finely divided purified hydrophyllic material bearing a highly purified non-drying neutral mineral oil in quantity sufficient to increase the rate of dispersion of said hydrophyllic material in water.

14. In a method of rendering finely divided purified pectin readily soluble in aqueous liquids, the step of adding a relatively small amount of a non-drying neutral purified mineral oil to a quantity of finely divided pectin during agitation of the mixture to produce a substantially dry product, the amount of oil used being sufficient to enhance the dispersion of the pectin and whereby to prevent lumping of the pectin when added to a relatively large body of aqueous liquid.

ALBERT KUBA EPSTEIN.